UNITED STATES PATENT OFFICE.

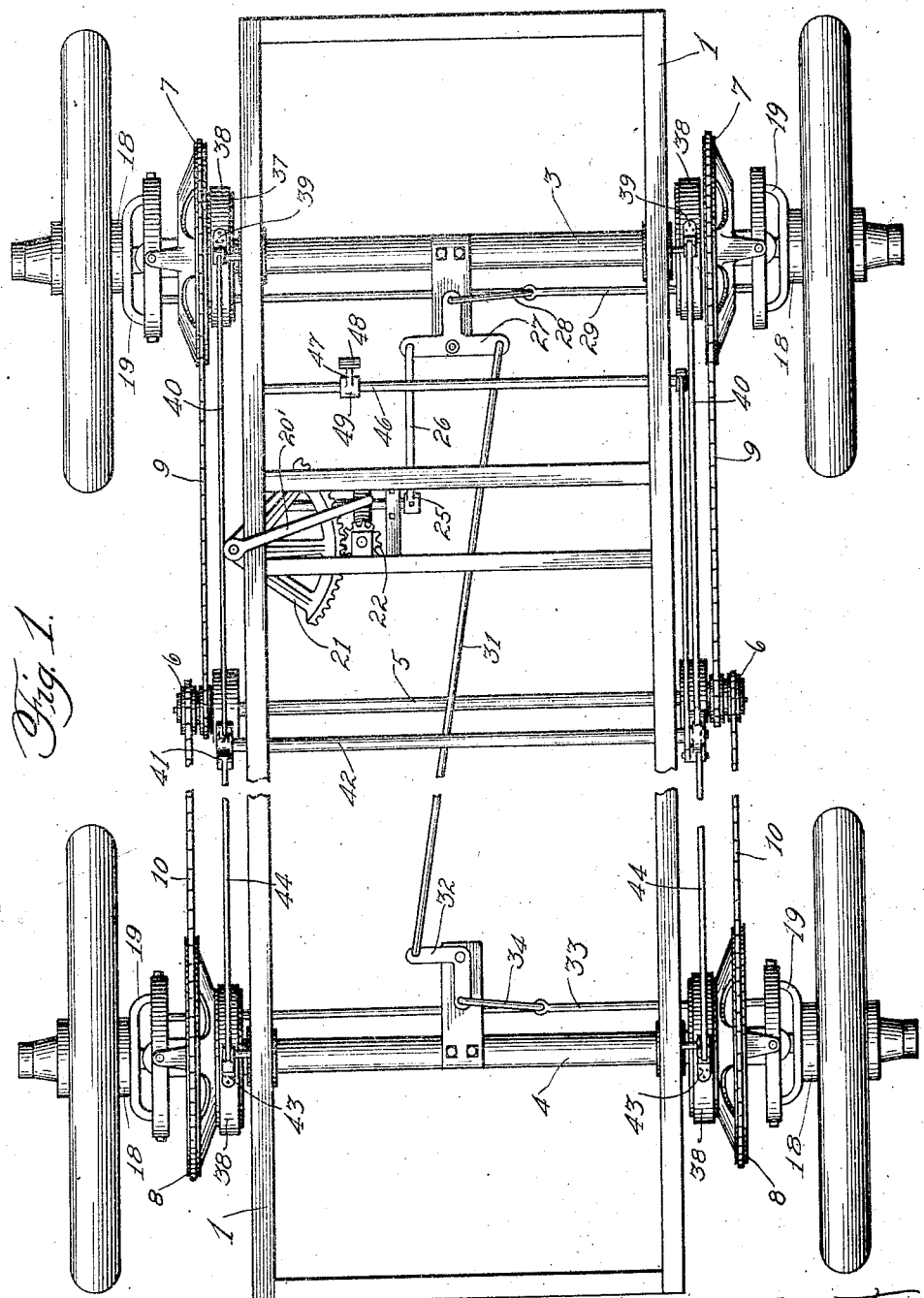

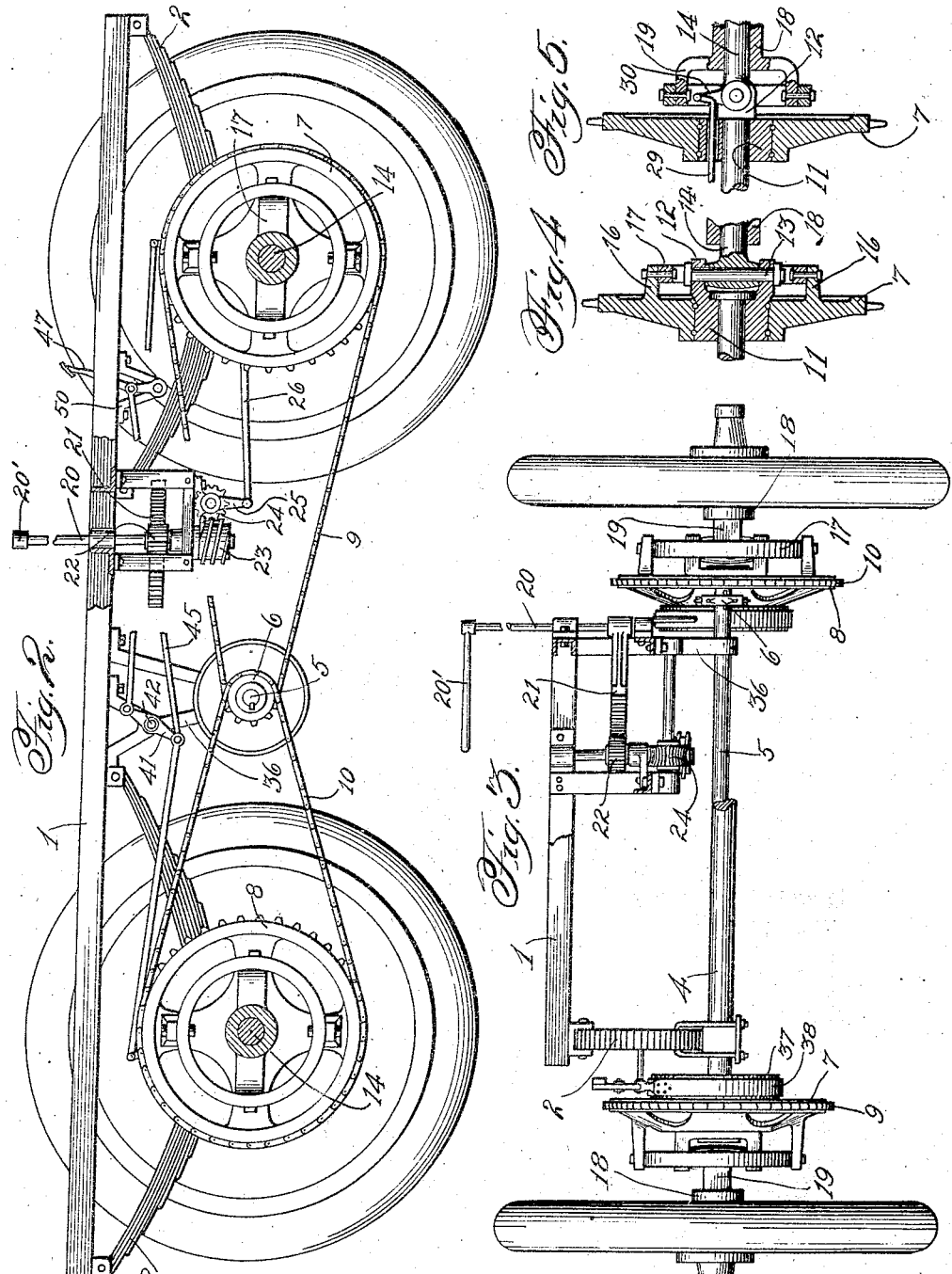

JESSE F. LIVINGOOD, OF NEW VIRGINIA, IOWA.

VEHICLE.

1,158,137.  Specification of Letters Patent.  Patented Oct. 26, 1915.

Application filed November 11, 1912. Serial No. 730,616.

*To all whom it may concern:*

Be it known that I, JESSE F. LIVINGOOD, a citizen of the United States, residing at New Virginia, county of Warren, State of Iowa, have invented new and useful Improvements in Controlling Mechanism for Vehicles, of which the following is a specification.

This invention relates to controlling mechanisms for vehicles; and has for one of its objects to provide an improved mechanism for steering both the rear and front wheels at the same time.

Another object of the invention is to provide means for driving both front and rear wheels at the same time.

A further object of the invention is to provide a brake band device, whereby all four wheels can be retarded and stopped at the same time. This brake band arrangement is particularly applicable to a combination where all four wheels are driven at the same time and especially where they have a chain and sprocket drive mechanism as herein provided and hereinafter to be described.

It is obvious that when a brake is applied to only one set of wheels, the body of the car is subjected to considerable strain.

An object of this invention is to annul this strain, which is brought about by the novel arrangement of driving both sets of wheels at the same time and braking all four wheels at the same time.

Furthermore, it is an object of the invention to provide an arrangement whereby both the front and rear wheels may be steered at the same time, and also be driven at the same time.

A still further object of the invention is to provide an arrangement whereby both the front and rear wheels may be steered at the same time, driven at the same time and braked at the same time.

To these ends, I have contrived a universal joint arrangement by which the two sets of wheels can be steered while in motion as well as when at rest, I have provided an intermediate driving shaft which is connected to both sets of wheels by a chain and sprocket wheel arrangement in order to drive all four wheels at the same time, and I have provided a brake band on each wheel which are all connected by links to one brake lever, by means of which all four wheels can be braked at the same time.

A feature of the device is that the mechanism may be so arranged that the parts can be easily examined and easily approached, thus facilitating the readjusting or replacing of any worn or broken parts without entailing extensive disassembling.

The above and other features, advantages and capabilities will become apparent from a detail description of the accompanying drawings in which—

Figure 1 shows a top plan view of the frame of a vehicle equipped with my improved steering mechanism, driving mechanism, and brake device. Fig. 2 is a side elevation of the same with the two nearest wheels removed, and other parts being broken away to show the controlling device in detail. Fig. 3 shows a front end view of the frame, with the front left wheel broken away and also portions of the body to show the controlling mechanism in detail, and Figs. 4 and 5 are front elevation and top plan views respectively of the universal joint arrangement, in each of which one-half being broken away to show the mechanism in detail.

With reference to the drawings, the frame or chassis 1 of a vehicle by means of springs 2, is suitably supported on the shafts or axles 3 and 4. At about the middle of the frame 1, two bracket members 36, 36 are provided suitably fastened to the underside of the frame 1. In these bracket members 36, 36, a driving shaft 5 is suitably journaled, which is provided with small sprocket wheels 6, 6 one at each of its ends. Axle 3 is provided with sprocket wheels 7, 7, one on each of its end portions, and axle 4, with sprocket wheels 8, 8, one on each of its end portions. Chains 9, 9 connect sprocket wheels 6, 6 with the sprocket wheels 7, 7, and chains 10, 10 connect sprocket wheels 6, 6 with sprocket wheels 8, 8. Sprocket wheels 7, 7 have their convex portion turned inward and sprocket wheels 8, 8 have their convex portion turned outward obviously to allow for the respective locations of the chains.

From the foregoing it will be seen that, by any suitable source of power, the drive shaft 5 may be driven and it, in turn will drive with it at the same time the two sets of sprocket wheels 7, 7 and 8, 8.

The rotation of the sprocket wheels 7, 7, and 8, 8 is transmitted to the wheels in the novel manner now to be described. Since the transmission is the same in all the wheels, it will only be necessary to describe one of them. In Fig. 4, the sprocket 7 is rotatably mounted on end portion 11. This end portion 11 is fast on axle 3 and is provided with a bifurcated portion 12 in which is suitably journaled a shaft 13. The outer axle portion 14 has an inner sleeve portion 15 rotatably mounted on shaft 13. Thus this universal joint arrangement will permit lateral movement of the axle 14. The sprocket wheel 7 has two bearing portions 16, 16 in which the annular bracket 17 is rotatably mounted. A collar 18 having a bifurcated portion 19 is rotatably mounted on axle 14. The two ends of this bifurcated portion 19 are connected to the annular bracket 17 at two diametrically opposite points on this annular bracket 17. The wheel is fixed on this collar 18 and thus will rotate with sprocket 7.

It will be obvious from the above that, the wheel, being mounted on collar 18 which is mounted on axle 14, will be laterally movable with the axle 14.

The steering or controlling mechanism of the lateral movement of the wheels is provided with a lever 20′ fast to vertical shaft 20 which vertical shaft 20 is suitably journaled under the main frame 1 and fixed to segmental gear 21. The segmental gear 21 meshes with an intermediate gear 22 which gear 22 at its lower portion is provided with a worm 23 (shown in Fig. 2). This worm 23 meshes with a small worm wheel 24. This worm wheel 24 has an arm 25 fast to it, which by means of a link 26 is connected to a rocker 27. Rocker 27 by means of a link 28 is connected to the shifting rod 29. This shifting rod 29 as clearly shown in Fig. 5 is pivotally connected to projection 30 fixed to sleeve 15. Thus by moving lever 20′ in a lateral direction, the shifting rod 29 will push or pull projection 30 and thereby give lateral movement to the wheel. With regard to the rear wheels, the operation is practically the same. The rocker 27 by means of an intermediate rod 31 is connected to rocker 32. The rocker 32 is connected to shifting rod 33 by means of a link 34, the shifting rod 33 being connected to the rear wheels to move them laterally. Thus when lever 19 is moved in either lateral direction, it will either push or pull rocker 32 and rocker 32 will, in turn, push or pull shifting rod 33 by means of link 34. This shifting rod 33 will operate to move the rear wheels laterally in exactly the same manner as above described with reference to the front wheels.

The brake device now to be described is particularly adapted for this chain and sprocket arrangement. On each of the wheels is provided a circular member 37, 37, fast with the sprocket wheels to rotate with them. About the periphery of these circular members 37, are loosely wound brake bands 38, 38, 38, 38. By means of plates 39, 39, fast on the brake bands of the front wheels, these brake bands are connected to rods 40, 40, which rods are each connected to one end of the rockers 41, 41 in the present instance, the upper end. These rockers 41, 41 are pivotally mounted on shaft 42, suitably journaled in the bracket members 36, 36. The brake bands on the rear wheels are likewise provided with plates 43, 43, which plates are connected to rods 44, 44. These rods are each pivotally connected to one end of the rockers 41, 41, in the present instance, the lower end. The lower end of each of the rockers 41, 41 is connected to one of the controlling rods 45, 45. These controlling rods 45, 45 are connected pivotally to shaft 46 which is journaled in rocker or pedal member 47. The pedal member can be of any suitable form. In the present instance, it is provided with a toe member 48 and a heel member 49. This pedal member 47 is pivotally mounted in a bracket 50. The arrangement is such that when the toe member 48 is pressed downward or forward, the controlling rods 45, 45 push the lower end of rockers 41, 41 rearward, thereby the rods 40, 40 will push forward to tighten brake bands 38, 38 about the front wheels, and the rods 44, 44 will push rearward to tighten the brake bands 38, 38 about the rear wheels. Thus, when it is desired, the four wheels can be braked at the same time, by merely pushing forward the toe member of pedal 47. It is obvious that if the controlling rods 45, 45 were connected to the upper end of rockers 41, 41, with very slight changes in the remainder of the mechanism, the same result could be accomplished.

While I have herein shown and described only one embodiment of my invention, it is to be understood that various changes and modifications may be made by those skilled in the art without departing from the scope of my invention as defined in the appended claim.

Having thus described my invention what I claim as new and desire to secure by Letters Patent is:

In a steering mechanism, the combination of a pair of axles, wheels, universal joints connecting one of the wheels with each end of the axles, an arm connected with each of the wheels for shifting them laterally, an operating shaft intermediate the axles, a worm wheel connected with the shaft, a second shaft, a worm connected with the last said shaft and meshing with the worm wheel, a pivoted sector, a gear connected with the said second shaft and meshing with the sector, an operating handle for swinging the sector about its pivot, a rod connecting each of the respective pairs of arms, a rocker arm adjacent each of the rods, a link connecting the rods with the respective rocker arms, a link connecting the rocker arms, an arm on the first recited shaft, and a link connecting the last said arm with one of the said rocker arms.

In witness whereof, I hereunto subscribe my name to this specification in the presence of two witnesses.

JESSE F. LIVINGOOD.

Witnesses:
BEN P. COLLINS,
A. C. PRINSE.